UNITED STATES PATENT OFFICE.

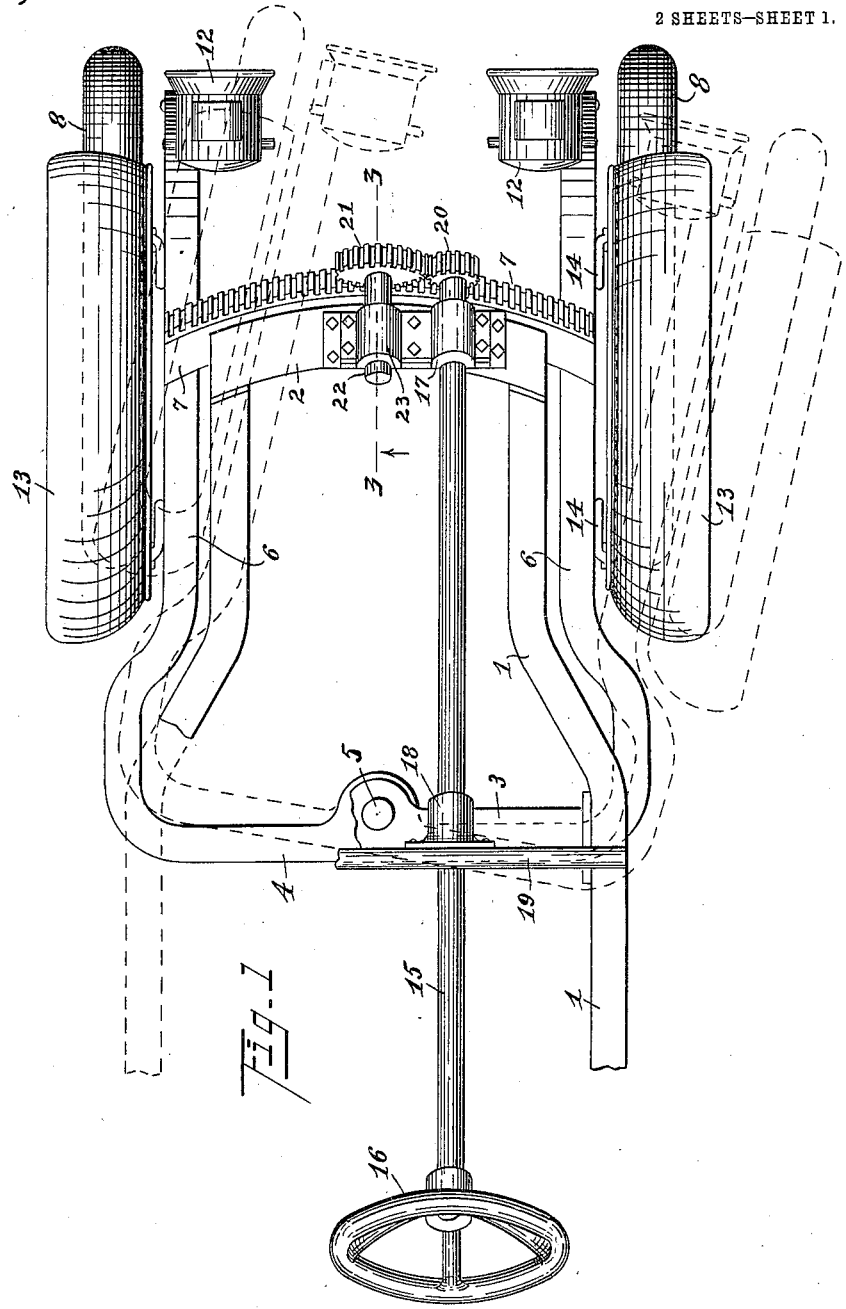

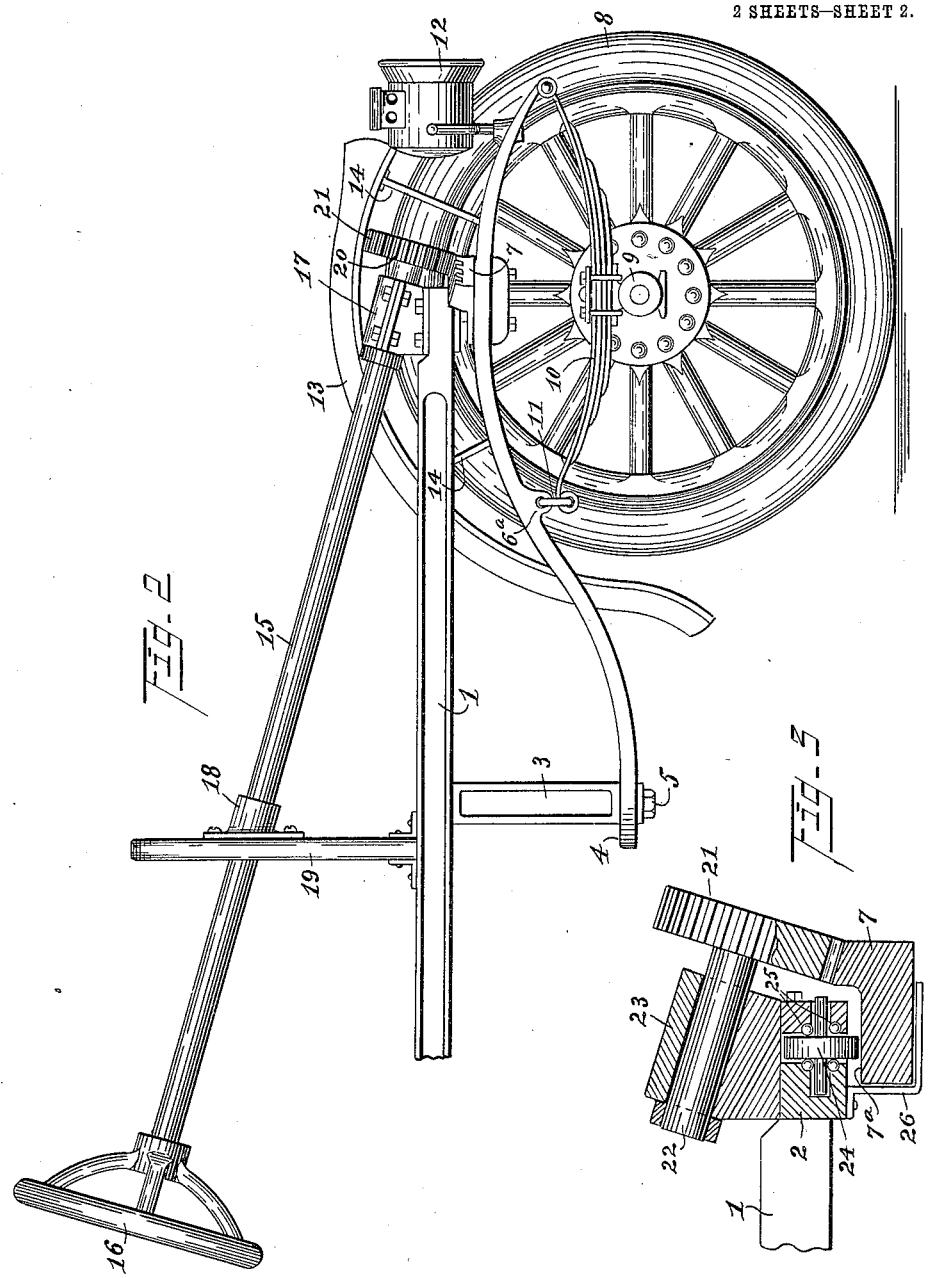

ELBERT L. WOOD, OF NEVADA, IOWA.

STEERING MECHANISM FOR AUTOMOBILES.

1,064,804.  Specification of Letters Patent.  Patented June 17, 1913.

Application filed July 28, 1911. Serial No. 641,183.

*To all whom it may concern:*

Be it known that I, ELBERT L. WOOD, a citizen of the United States, residing at Nevada, in the county of Story and State of Iowa, have invented certain new and useful Improvements in Steering Mechanism for Automobiles, of which the following is a specification.

My invention relates to improvements in steering mechanism for automobiles, motor trucks, and other horseless vehicles, the primary object being to provide a generally improved steering mechanism of this class of exceedingly simple, cheap, and efficient construction having the following purposes and advantages: First: the provision of a truck frame swiveled or pivoted to the front of the main frame and mounted upon a rigid front axle whereby the front wheels of the vehicle may be steered by the swinging of the truck frame. Second: the provision of a truck frame adapted to carry the fenders and head lights in proper position and to follow the angle of inclination of the front wheels as the latter are turned through the medium of the truck frame and steering device. Third: the elimination of stud steering axles and steering arms and link bars whereby the liability of breakage or disarrangement of the parts is reduced to a minimum. Fourth: the elimination of vibration in the front wheels and steering mechanism. Fifth: an improved support for the front portion of the main frame.

With the above-mentioned and other ends in view, the invention consists in the novel construction, arrangement, and combination of parts, hereinafter described, illustrated in one of its embodiments in the accompanying drawings, and particularly pointed out in the appended claims.

Referring to the drawings, forming a part of this specification, Figure 1, is a top plan view of the improved steering mechanism attached to the front end of the main frame, a portion of the latter being broken away for the purpose of clearer illustration of the parts. Fig. 2, a side elevation of the same, one of the front wheels being removed. Fig. 3, a sectional view taken on line 3—3 of Fig. 1.

Similar numerals of reference designate like parts throughout all the figures of the drawings.

The main frame 1, is preferably narrowed or reduced at its front and terminates in a head bar or member 2, and is provided with a bolster member or cross bar 3, a substantial distance to the rear of the head member 2. The bolster bar 3, is preferably bowed downwardly so that its central bearing portion will be carried some distance below the plane of the main frame 1, as shown most clearly in Fig. 2, of the drawings.

The truck or front axle frame comprises a cross or bolster member 4, secured to the bolster or cross bar 3, by means of a pivot or king bolt 5, and upwardly curved forwardly extending side bars or members 6, said side bars being connected at their front by means of a segmental rack 7, in close proximity to the head 2, of the main frame, and, in the present instance, arranged in close proximity to and immediately in front of said head of bearing member 2, of the main frame.

The front wheels 8, are mounted on rigid spindles at the ends of the front axle 9, said front axle being carried by and connected to the truck frame by means of eliptical springs 10, disposed beneath the curved portions of the side bars 6, said springs being connected at their rear ends by means of hanger links 11, carried in eye members 6ª, depending from the side members 6.

The lamps 12, are mounted at the front ends of the side members 6, of the truck frame in any suitable and convenient manner, and the front fenders 13, are likewise mounted upon the side bars 6, by means of brackets 14.

As a means for carrying or moving the front axle 9, and wheels 8, together with the truck frame and lamps and fenders carried thereby, to the right or left, as desired, in the steering operation, a steering column 15, and wheel 16, are provided, said steering column 15, being mounted in suitable bearings 17, and 18, carried by the head bar 2, and the foot board 19, of the main frame, respectively, said steering column being provided at its lower end with a pinion 20, meshing with a gear wheel 21, the latter meshing with the segmental rack 7, and being mounted and supported upon a stub shaft 22. The stub shaft 22, is mounted in a bearing 23, at the center of the head bar or member 2, of the main frame.

As a convenient means for supporting and carrying the front portion of the main frame upon the segmental rack 7, of the truck frame, said segmental rack is provided with a track portion 7ᵃ, adapted to receive and support an antifriction wheel 24, carried by and extending beneath the curved head member 2, of the main frame and preferably mounted in ball bearings 25, as shown most clearly in Fig. 3, of the drawings. The adjacent parts are also held in proper relative position by means of a tongue guide member 26, carried by the head member 2, and extending beneath the segmental rack 7, as shown in said Fig. 3, of the drawings.

It will be observed upon referring to the arrangement of the parts that when the steering wheel 6, and column 15, are turned to the right the gear wheel 21, by its engagement with the rack 7, will cause the truck frame together with the axle 9, front wheels, and fenders carried by the truck frame to be moved in unison to the right as indicated by dotted lines in Fig. 1, of the drawings, and vice versa, when the steering column 15, and wheel 16, are turned to the left.

From the foregoing description, taken in connection with the accompanying drawings, the operation and advantages of my invention will be readily understood.

Having thus described an embodiment of my invention, what I claim and desire to secure by Letters Patent is,—

1. In a steering gear for automobiles, a main frame provided with a head member and a depending bolster bar at the rear and below the plane of the head member thereof, a truck frame consisting of a bolster bar pivotally connected to said bolster bar and provided with forwardly extending curved side members below the plane of the front end of said main frame, elliptical springs secured to said curved side members, an axle member secured beneath said elliptical springs in front of the pivoted connection between said bolster bars, and steering mechanism carried by said main frame and operatively connected to said curved side members.

2. In a steering mechanism for automobiles, a main frame provided with a bolster bar and a head member, a truck frame consisting of a truck bolster pivoted to said bolster bar and provided with forwardly extending upwardly curved side members below the plane of said main frame, a cross member connected to said curved side members, elliptical springs mounted beneath and secured to said curved side members, and an axle carried beneath said springs in substantially the same plane with the pivoted portion of said truck bolster.

In testimony whereof I have affixed my signature in presence of two witnesses.

ELBERT L. WOOD.

Witnesses:
B. K. OLINGER,
GEO. A. KLOVE.

---

Copies of this patent may be obtained for five cents each, by addressing the "Commissioner of Patents, Washington, D. C."